US008113760B1

(12) United States Patent
Schroll

(10) Patent No.: US 8,113,760 B1
(45) Date of Patent: Feb. 14, 2012

(54) SECURE LOADING SYSTEM

(76) Inventor: Sean Schroll, Ravenna, NE (US)

(*) Notice: Subject to any disclaimer, the term of this patent is extended or adjusted under 35 U.S.C. 154(b) by 380 days.

(21) Appl. No.: 12/464,864

(22) Filed: May 12, 2009

Related U.S. Application Data

(60) Provisional application No. 61/052,472, filed on May 12, 2008.

(51) Int. Cl.
*B60P 1/44* (2006.01)
*B60P 3/06* (2006.01)

(52) U.S. Cl. .......................... 414/541; 414/522; 414/921

(58) Field of Classification Search ............. 414/331.16, 414/331.17, 331.18, 349, 352, 522, 541, 414/609, 331.11, 608, 611, 921
See application file for complete search history.

(56) References Cited

U.S. PATENT DOCUMENTS

| | | | | |
|---|---|---|---|---|
| 2,096,958 | A * | 10/1937 | Clerc | 414/276 |
| 2,737,304 | A * | 3/1956 | Curts | 414/522 |
| 3,540,607 | A | 11/1970 | Mandel | |
| 3,581,544 | A * | 6/1971 | Grimes | 72/253.1 |
| 3,661,228 | A | 5/1972 | Glasser | |
| 3,788,500 | A * | 1/1974 | Lemelson | 414/792.8 |
| 3,913,759 | A | 10/1975 | Deacon | |
| 4,016,991 | A * | 4/1977 | Oldford | 414/400 |
| 4,081,091 | A | 3/1978 | Thorley | |
| 4,083,429 | A | 4/1978 | Abbott | |
| 4,109,806 | A * | 8/1978 | Johansson et al. | 104/29 |
| 4,124,130 | A | 11/1978 | Rohrs et al. | |
| 4,164,292 | A | 8/1979 | Karkau | |
| 4,180,366 | A | 12/1979 | Roth et al. | |
| 4,252,491 | A | 2/1981 | Hock | |
| 4,278,395 | A * | 7/1981 | Thunell | 414/814 |
| 4,299,527 | A | 11/1981 | Pobocik et al. | |
| 4,325,668 | A | 4/1982 | Julian et al. | |
| 4,345,669 | A | 8/1982 | Noall | |
| 4,353,436 | A | 10/1982 | Rice et al. | |
| RE31,178 | E | 3/1983 | Deacon | |
| 4,466,771 | A | 8/1984 | Thorley et al. | |
| 4,543,027 | A * | 9/1985 | Jones | 414/400 |
| 4,556,128 | A | 12/1985 | Thorley et al. | |
| 4,664,584 | A | 5/1987 | Braun et al. | |
| 4,671,730 | A | 6/1987 | Gateau | |
| 4,907,936 | A | 3/1990 | Bourdage | |
| 4,951,779 | A * | 8/1990 | Tseng | 182/14 |
| 4,958,979 | A * | 9/1990 | Svensson | 414/549 |
| 4,984,955 | A | 1/1991 | McCullough | |
| 5,026,244 | A | 6/1991 | Dorn | |
| 5,040,936 | A | 8/1991 | Rhea | |
| 5,040,939 | A | 8/1991 | Booth | |

(Continued)

FOREIGN PATENT DOCUMENTS

| | | |
|---|---|---|
| CA | 2174382 | 10/1997 |

(Continued)

*Primary Examiner* — James Keenan

(74) *Attorney, Agent, or Firm* — Sean C. Crandall; Jackson Walker LLP

(57) ABSTRACT

A secure loading system operates with a wheelchair lift attached to a vehicle, securing the wheelchair to a platform during the lifting motion and retracting the platform into the vehicle once the wheelchair has been lifted, or performing a reverse operation wherein the platform is extended to the lift for lowering the wheelchair. The secure loading system may be an after-market add-on to a lift, or may be integrated into the lift at design time. The system may also be adapted for many other embodiments wherein a secured platform is needed during a lifting motion.

2 Claims, 12 Drawing Sheets

U.S. PATENT DOCUMENTS

| | | | | |
|---|---|---|---|---|
| 5,050,708 | A | 9/1991 | Wood | |
| 5,052,879 | A | 10/1991 | Wolfe | |
| 5,110,252 | A | 5/1992 | Aoki | |
| 5,149,246 | A | 9/1992 | Dorn | |
| 5,158,419 | A | 10/1992 | Kempf et al. | |
| 5,180,275 | A | 1/1993 | Czech et al. | |
| 5,234,311 | A | 8/1993 | Loduha, Jr. et al. | |
| 5,261,779 | A | 11/1993 | Goodrich | |
| 5,308,214 | A | 5/1994 | Crain et al. | |
| 5,346,355 | A * | 9/1994 | Riemer | 414/542 |
| 5,375,962 | A | 12/1994 | Kempf | |
| 5,382,130 | A | 1/1995 | Kempf | |
| 5,401,135 | A | 3/1995 | Stoen et al. | |
| 5,421,692 | A | 6/1995 | Varrichio et al. | |
| 5,445,488 | A | 8/1995 | Saucier et al. | |
| 5,553,990 | A | 9/1996 | Kytola, Sr. | |
| 5,605,431 | A | 2/1997 | Saucier et al. | |
| 5,674,043 | A | 10/1997 | Dorn | |
| 5,806,632 | A | 9/1998 | Budd et al. | |
| 5,827,035 | A * | 10/1998 | Fuke et al. | 414/416.04 |
| 5,865,593 | A | 2/1999 | Cohn | |
| 5,901,812 | A | 5/1999 | Meunier | |
| 5,944,473 | A | 8/1999 | Saucier et al. | |
| 5,975,830 | A | 11/1999 | Goodrich et al. | |
| 6,039,528 | A | 3/2000 | Cohn | |
| 6,042,327 | A | 3/2000 | DeLeo et al. | |
| 6,065,924 | A | 5/2000 | Budd et al. | |
| 6,077,025 | A | 6/2000 | Budd et al. | |
| 6,086,314 | A | 7/2000 | Savaria | |
| 6,095,747 | A | 8/2000 | Cohn | |
| 6,203,266 | B1 | 3/2001 | Savaria et al. | |
| 6,238,169 | B1 | 5/2001 | Dupuy et al. | |
| 6,305,897 | B1 | 10/2001 | Budd et al. | |
| 6,309,170 | B1 | 10/2001 | Vartanian | |
| 6,361,131 | B1 | 3/2002 | Powell, Jr. | |
| 6,379,102 | B1 | 4/2002 | Kameda | |
| 6,398,479 | B1 | 6/2002 | Dupuy et al. | |
| 6,435,804 | B1 | 8/2002 | Hutchins | |
| 6,461,097 | B1 | 10/2002 | Ablabutyan et al. | |
| 6,464,447 | B2 | 10/2002 | Dupuy et al. | |
| 6,575,685 | B2 * | 6/2003 | Baxter, Sr. | 414/10 |
| 6,585,474 | B1 | 7/2003 | Kameda | |
| 6,648,579 | B2 | 11/2003 | Vartanian, Sr. | |
| 6,666,643 | B1 | 12/2003 | Heynssens | |
| 6,726,435 | B1 * | 4/2004 | Williams et al. | 414/542 |
| 6,729,827 | B1 | 5/2004 | Williams et al. | |
| 6,739,824 | B2 | 5/2004 | Dupuy et al. | |
| 6,837,670 | B2 | 1/2005 | Goodrich | |
| 6,948,903 | B2 | 9/2005 | Ablabutyan et al. | |
| 7,306,422 | B2 | 12/2007 | Dupuy et al. | |
| 7,326,024 | B2 | 2/2008 | Cohn et al. | |
| 2001/0031195 | A1 | 10/2001 | Dupuy et al. | |
| 2002/0076313 | A1 | 6/2002 | Vartanian, Sr. | |
| 2003/0071434 | A1 | 4/2003 | Budd | |
| 2003/0213653 | A1 | 11/2003 | Morris | |
| 2004/0028513 | A1 | 2/2004 | Reynolds | |
| 2004/0146385 | A1 | 7/2004 | Edwards et al. | |
| 2004/0184906 | A1 | 9/2004 | Dupuy et al. | |
| 2004/0228713 | A1 | 11/2004 | Cohn et al. | |
| 2006/0104775 | A1 | 5/2006 | Kasten, Jr. et al. | |
| 2006/0233632 | A1 | 10/2006 | Hayes et al. | |
| 2007/0183881 | A1 | 8/2007 | O'Leary et al. | |
| 2007/0224024 | A1 * | 9/2007 | Yang | 414/522 |
| 2008/0079252 | A1 | 4/2008 | Shutter et al. | |

FOREIGN PATENT DOCUMENTS

| | | | | | |
|---|---|---|---|---|---|
| EP | 0444386 | A1 | * | 9/1991 | 414/541 |
| GB | 2105296 | A | * | 3/1983 | 414/522 |
| GB | 2183620 | A | * | 6/1987 | 414/608 |
| JP | 5-116877 | A | * | 5/1993 | 414/609 |

* cited by examiner

SECURE LOADING SYSTEM

CROSS REFERENCE TO RELATED APPLICATIONS

This application claims the benefit of U.S. Provisional Application 61/052,472, filed May 12, 2008.

BACKGROUND

This specification relates to the field of mechanical lifting systems and more particularly to a secure loading system for use in a lifting system.

Lifting systems such as wheelchair lifts may include a platform for carrying a load and a hydraulic or other mechanical system for lifting. In some such lifting systems, the load may be susceptible to shifting or other unsecured motion during the lifting process, which may lead to either physical injury or harm to goods.

SUMMARY OF THE INVENTION

Figure 1:
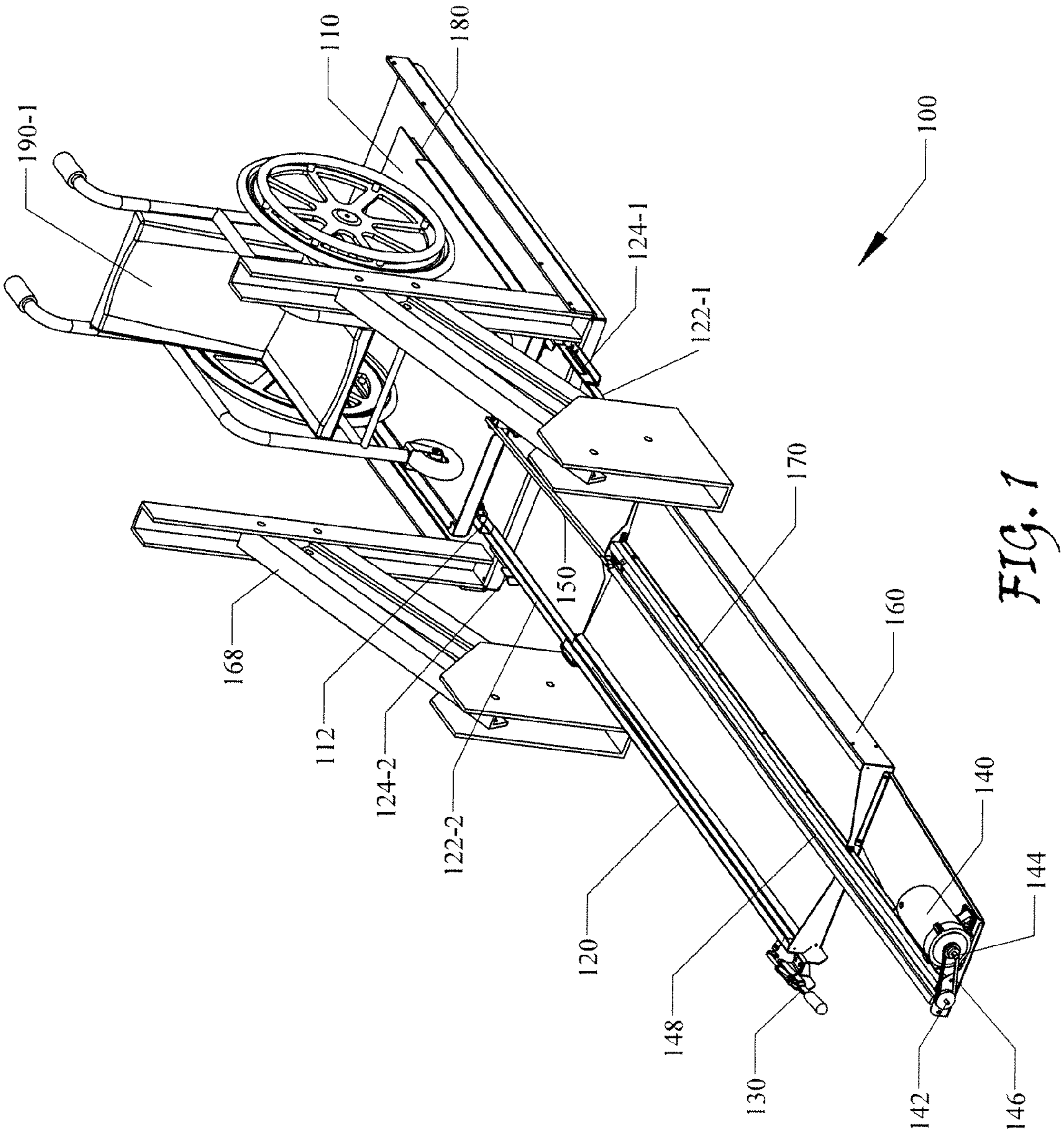
FIG. 1 is a perspective view of an exemplary embodiment of a secure loading system.

In one aspect, a secure loading system operates with a wheelchair lift attached to a vehicle, securing the wheelchair to a platform during the lifting motion and retracting the platform into the vehicle once the wheelchair has been lifted, or performing a reverse operation wherein the platform is extended to the lift for lowering the wheelchair. The secure loading system may be an after-market add-on to a lift, or may be integrated into the lift at design time. The system may also be adapted for many other embodiments wherein a secured platform is needed during a lifting motion.

DETAILED DESCRIPTION OF THE EMBODIMENTS

A secure loading system is used to secure a load to a platform during a lifting or lowering motion, and to provide the ability to move the load into a desired position. An embodiment disclosed herein discloses that the load may be a wheelchair, but this is not intended to limit the invention to the specific embodiment described in the figures. A secure loading system may be useful for a variety of different types of lifts and loads. Furthermore, a secure loading system may be provided either as an after-market add-on to an existing lift system, or may be integrated into a lift system.

A secure loading system will now be described with more particular reference to the attached drawings. Hereafter, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance or example of an element and the un-hyphenated form of the reference numeral refers to the element generically or collectively. Thus, for example, 102-1 may refer to a "pen," which may be an instance or example of the class of "writing implements." Writing implements may be referred to collectively as "writing implements 102" and any one may be referred to generically as a "writing implement 102."

FIG. 1 is a perspective view of an exemplary embodiment of a secure loading system. In this embodiment, a platform 110 rests on a support frame 180. Platform 110 may be constructed of any suitably rigid material, including, by way of non-limiting example metals, plastics, composites. For example, platform 110 may be constructed of ⅜" steel. The design and composition of platform 110 may be tailored to support load 190. In the disclosed embodiment, the load 190 is a wheelchair 190-1. Load 190 may be secured to platform 110 by means suitable for preventing shifting, sliding, or other movement relative to the platform. For example, in the case of wheelchair 190-1, a four-point tie-down system may be employed to secure wheelchair 190-1 to platform 110. Other possibilities will be apparent to those of skill in the art.

Figure 1A:
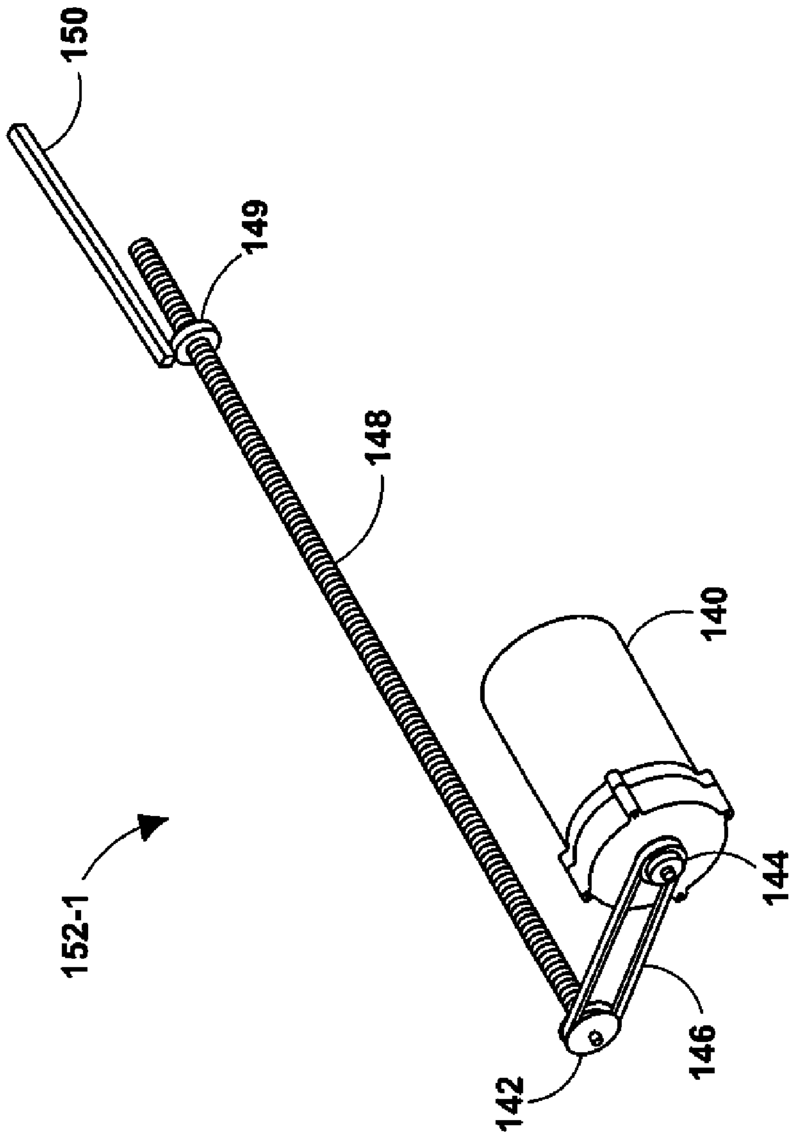
FIG. 1A is a detail view of an exemplary embodiment of an actuator for use with a secure loading system.
Figure 1B:
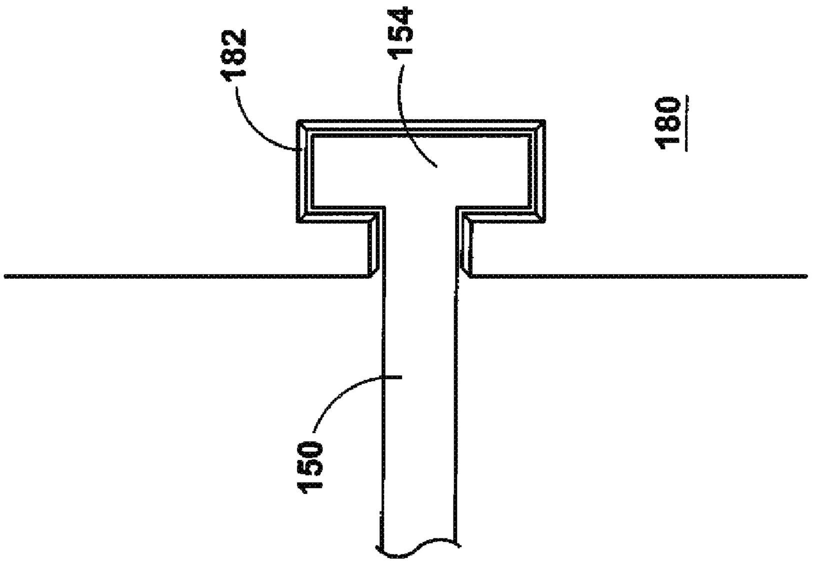
FIG. 1B is a detail view of an exemplary embodiment of a t-shaped connector engaging a t-shaped slot.
Figure 5:
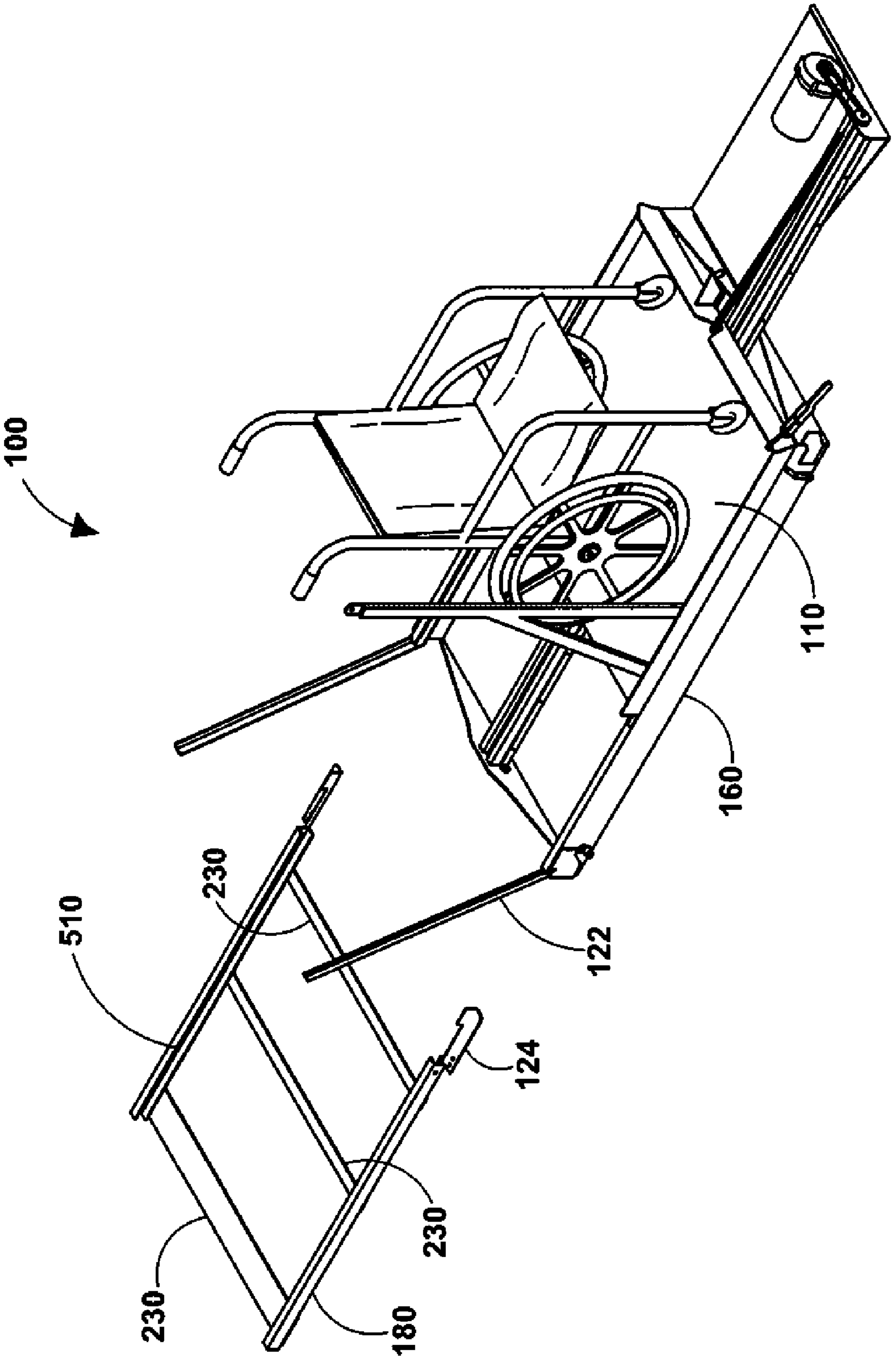
FIG. 5 is a perspective view of an exemplary embodiment of a secure loading system, more particularly disclosing a state wherein the secure platform is disengaged from the support frame.
Figure 8:
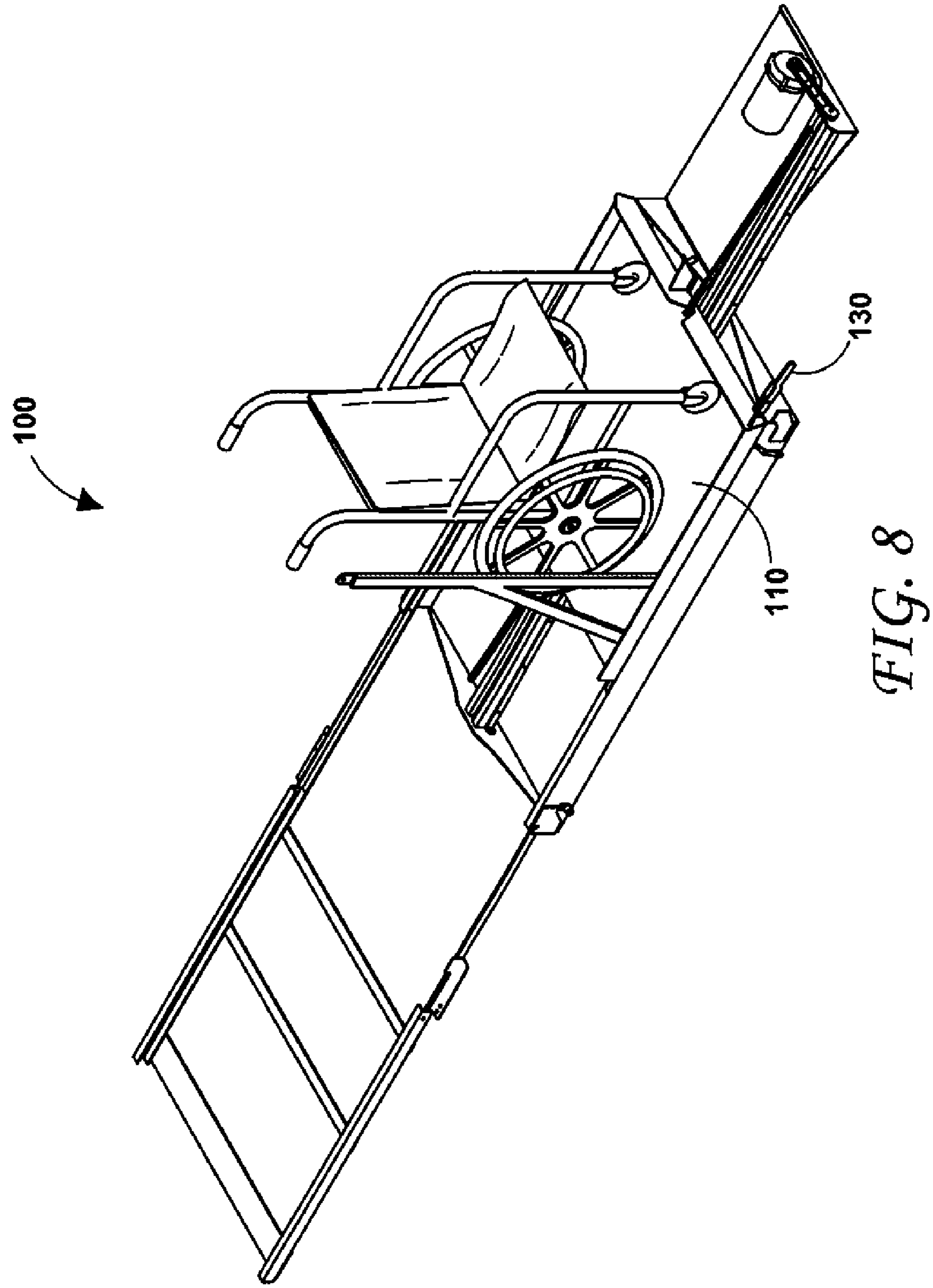
FIG. 8 is an exemplary embodiment of a secure loading system, more particularly disclosing a fully retracted state.

Platform 110 may be mechanically coupled to support frame 180 by framework tracks 510 (FIG. 5). In some embodiments, support frame 180 may be fixedly attached to a lift platform (not shown); for example, support frame 180 may be bolted to the lift, which in some cases may contain a separate lift platform that is a fixed part of the lift. The lift may be any of numerous lifts available in the art, such as the lifts disclosed in U.S. Pat. No. 4,121,695 to Carpenter, U.S. Pat. No. 4,252,491 to Hock, and U.S. Pat. No. 5,065,844 to Hon, among others. In other embodiments, a lift system may be designed from the ground up according to the present invention, such that platform 110 is an integral part of the lift. In this case, support frame 180 and platform 110 may be unnecessary as separate attachments, as they may be functionally integrated into an off-the-shelf lift platform. Platform 110 may include platform rails 112 which may be configured slidably engage framework tracks 510 (FIG. 5), so that platform 110 may easily move relative to support frame 180 and freely engage or disengage support frame 180. To achieve the configuration disclosed in FIG. 1, the lift mechanism would be in the "up" position so that the platform 110 is substantially coplanar with mechanical guide 160. A mechanical guide, as used herein, is any device or mechanism designed to guide a platform such as platform 110, and may include a framework, tracks, mounting structures, and any other components suited to its purpose. Also per the disclosed embodiment, mechanical guide 160 provides the supporting framework on which platform 110 rests in its retracted position inside a vehicle. A vehicle, as used herein, includes motor vehicles as per the exemplary embodiment, as well as any other mobile or stationary structure into which the load 190 is to be transferred. In some embodiments, mechanical guide 160 may be separate from an interior support structure. In this configuration, arm extensions 122 are extended to couple mechanical guide 160 to support frame 180. Arm extensions 122 provide an extension of track 120, which may be a C-channel tracker, which may allow platform 110 to travel freely from the fully extended position shown in FIG. 1 to a fully retracted position, as shown in FIG. 8. In this embodiment, a drive shaft 150 is provided to engage platform 110, and is rigid so that the drive shaft 150 may either push the platform 110 to an extended position, or pull it inward to a retracted position. In this embodiment, drive shaft 150 is biased downward, for example with a spring loaded mechanism, so that it firmly engages platform 110 when platform 110 is in the raised position, and also easily disengages when platform 110 is lowered. Drive shaft 150 may terminate in a T-shaped connector 154 (FIG. 1B), which may engage T-shaped slot 182 (FIG. 1B). While a T-shaped connector 154 is disclosed, persons have skill in the art will recognize that many securing devices will provide the same or similar functionality.

Drive shaft 150 is actuated by a linear actuator 152-1 (FIG. 1A), which is a species of actuator 152. Linear actuator 152-1 includes an electric motor 140, with a rotor 144 engaging a belt 146 which turns a pulley 142. Pulley 142 is fixedly connected to an end of screw 148, which forms part of a nut and screw transducer. Drive shaft 150 is mechanically affixed to screw 148 by nut 149. In this configuration, when electric motor 140 turns, screw 148 engages nut 149 causing drive shaft 150 to either retract or extend the platform. Screw 148 may be partially enclosed by a screw encasement 170, which may be made of a rigid polymer or other rigid material. Screw encasement 170 provides some mechanical protection for screw 148. As platform 110 is extended or retracted, platform rails 112 will move along track 120, which may be a C-channel track. When platform 180 is engaged with arm extensions 122, platform 180 and arm extensions 122 may be secured to each other by hinged locks 124. A platform lock 130 is provided to secure platform 110 when in a fully-retracted position. Platform lock 130 may be biased downward so that it automatically engages platform 110 in a fully-retracted position. Persons having skill in the art will recognize that a downward-biased latch mechanism is one of only many possible embodiments of a platform lock 130. For example, Q'Straing provides a commercially-available "QLK-100" docking system, which employs securing brackets. Such a system would also be suitable for platform lock 130, as would any other device configured to secure platform 110 to mechanical guide 160 when in a fully-retracted position.

Although a linear actuator and drive shaft has been disclosed as an exemplary embodiment, other configurations may achieve the same result. For example, platform 110 may have an internal motor to provide the function of an actuator, in which case the drive mechanism may be provided by wheels and axles. The terms "actuator" and "drive" as used herein are intended to broadly encompass any such system intended to actuate motion in platform 110.

Figure 2:
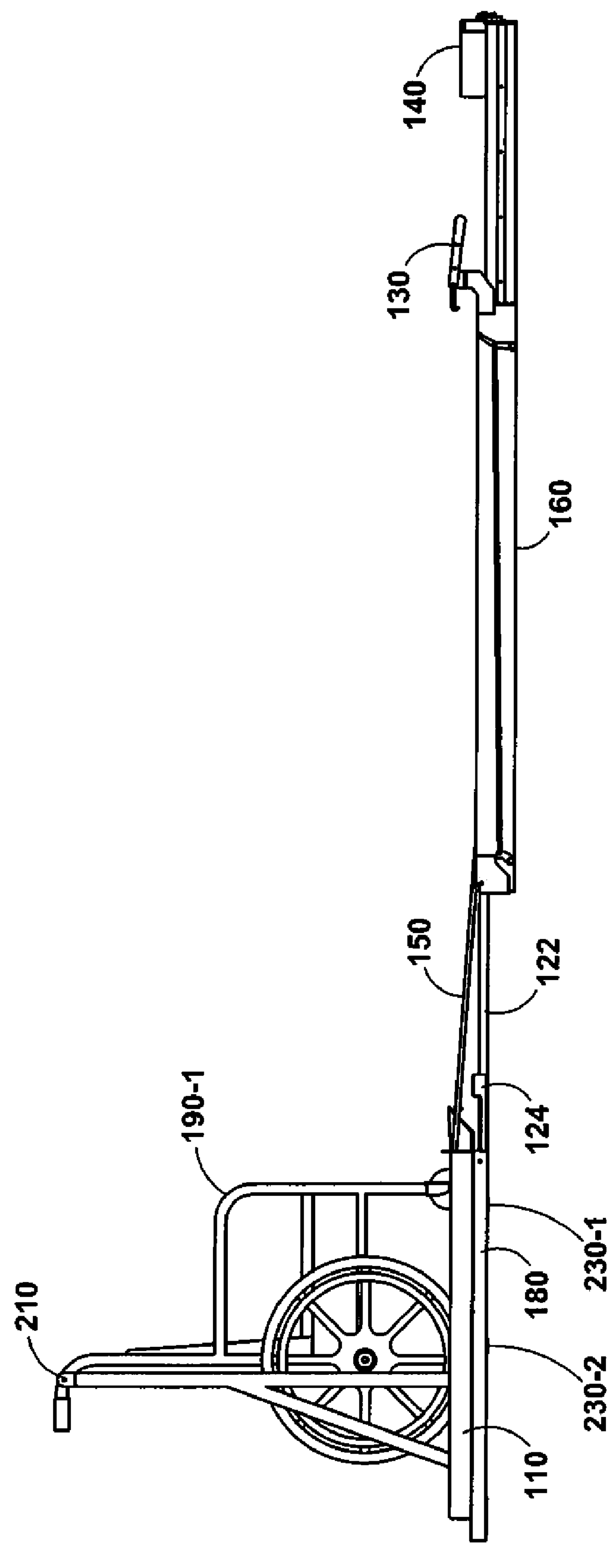
FIG. 2 is a side-view of an exemplary embodiment of a secure loading system.

FIG. 2 is a side view of an exemplary embodiment of a secure loading system 100. This embodiment more clearly discloses shoulder restraint securing bar 210, which may be provided so that an occupant of wheelchair 190-1 can use a shoulder restraint while riding in a vehicle. Shoulder restraint securing bar 210 may help ensure that secure loading system 100 complies with applicable safety laws. Also visible in this view are orthogonal stabilizing bars 230. These help to ensure the structural integrity of the support frame 180 under load 190.

Figure 3:
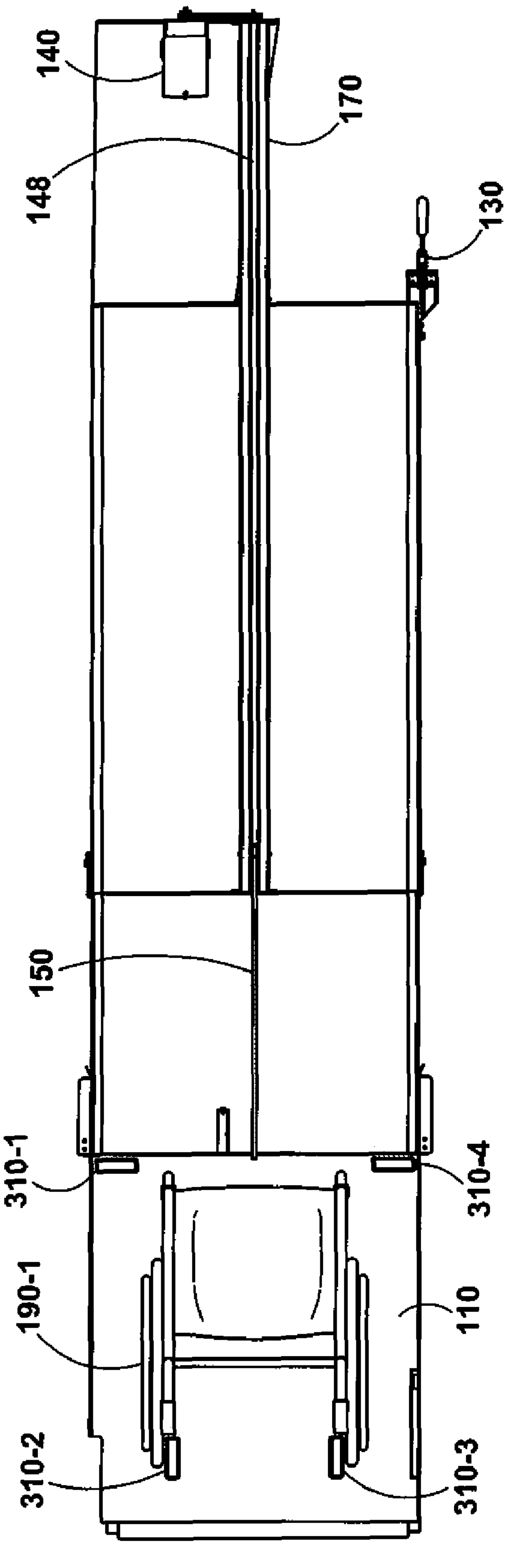
FIG. 3 is a top-view of an exemplary embodiment of a secure loading system.

FIG. 3 is a top view of a secure loading system 100. In this view, wheelchair tie-downs 310 are visible. Wheelchair tie-downs 310 are provided to secure the wheelchair 190 to platform 110. In this example, a four-point tie-down is used. Suitable four-point mechanisms are available from commercial vendors. For example, Q'Straint provides an L-track floor anchor, an oval 1-pocket anchor, a slide and click anchor, a pocket floor anchor, and an A-plate anchor. In other embodiments, other securing mechanisms 310 may be used to secure load 190 to wheelchair platform 110. For example, Q'Straint provides the QLK-100 docking system, which is bracket-based, or in other embodiments, tether-based restraints may be used.

Figure 4B:
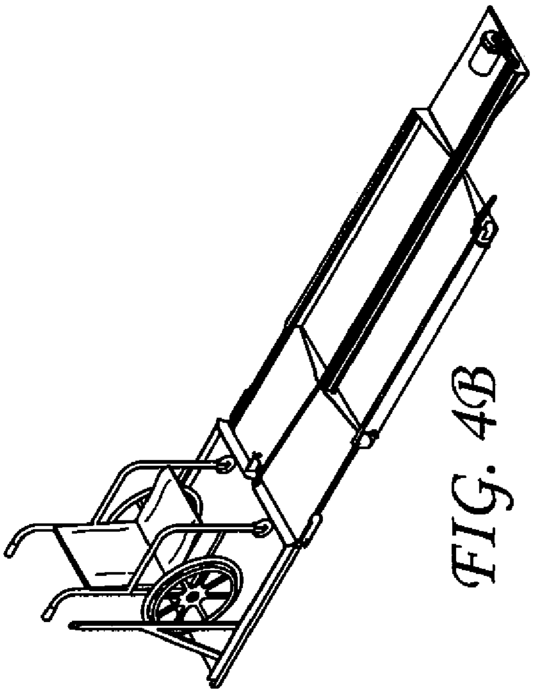
FIG. 4B is an additional perspective view of an exemplary embodiment of a secure loading system.
Figure 4D:
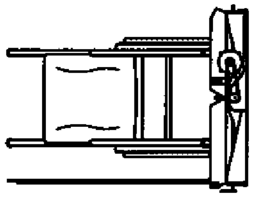
FIG. 4D is a front view of an exemplary embodiment of a secure loading system.
Figure 4A:
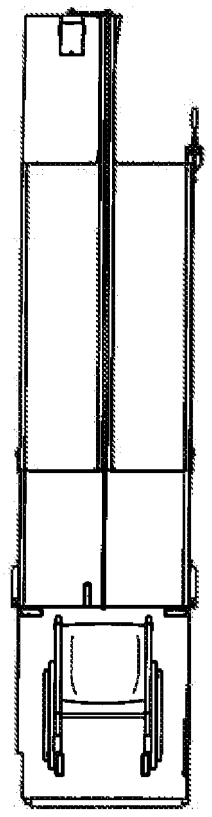
FIG. 4A is an additional top-view of a secure loading system.

FIG. 4A is an additional top view of an exemplary embodiment of a secure loading system 100.

FIG. 4B is an additional perspective view of an exemplary embodiment of a secure loading system 100.

Figure 4C:
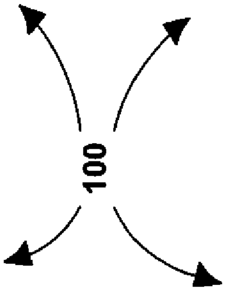
FIG. 4C is an additional side-view of a secure loading system.
Figure 4C:
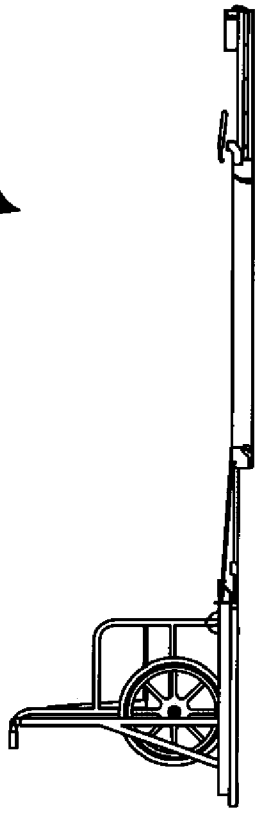

FIG. 4C is an additional side view of an exemplary embodiment of a secure loading system 100.

FIG. 4D is a front view of an exemplary embodiment of a secure loading system 100.

FIG. 5 is an additional perspective view of an exemplary embodiment of a secure loading system 100. In this view, arm extensions 122 are unlocked from hinged locks 124 and disengaged from support frame 180. With arm extensions 122 disengaged from support frame 180, guide tracks 510 are more plainly visible. In this view, it can be seen that guide tracks 510 may be C-channel tracks configured to receive platform rails 112. Also more plainly visible in this view are orthogonal stabilizing bars 230.

In this view it is more apparent that in some embodiments, platform 110 and mechanical guide 160 may completely disengage from support frame 180 at certain times. In some embodiments, this is necessary because support frame 180 will be attached to a lift platform (not shown). The lift platform may need to move independently of platform 110 and support frame 160. This will allow the mechanical lift platform to freely move up and down through its lifting and lowering motion.

Figure 6:
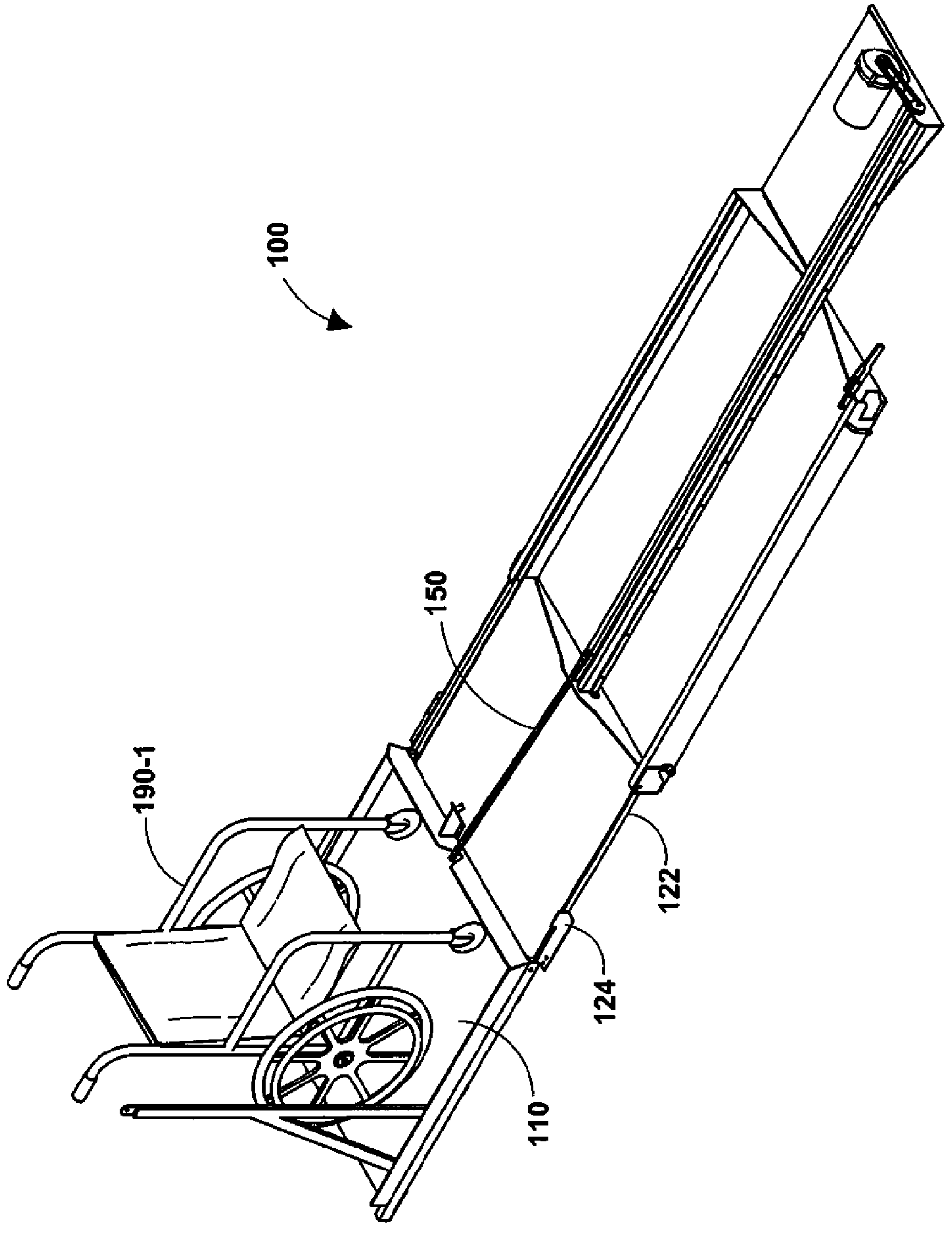
FIG. 6 is a perspective view of an exemplary embodiment of a secure loading system more particularly disclosing a fully extended state.

FIG. 6 discloses an additional perspective view of an exemplary embodiment of a secure loading system. In this embodiment, secure platform 110 is in its completely extended position. In this configuration, platform locks 124 are ready to be disengaged from arm extensions 122. When these are disengaged from each other, platform 110 is resting on support frame 180, which may be attached to (or an integral part of) a lift platform, and load 190 may be lowered by the mechanical lift. The position shown in FIG. 6 is also the position in which the system will be after the mechanical lift has been moved to its fully raised position. Because drive shaft 150 may be biased downward, whenever support frame 180 raises platform 110 to a fully raised position, T-shaped connector 154 may automatically seat into t-shaped slot 182. The downward bias of drive shaft 150 may help to ensure that the coupling of t-shaped connector 154 to t-shaped slot 182 is mechanically secure.

Figure 7:
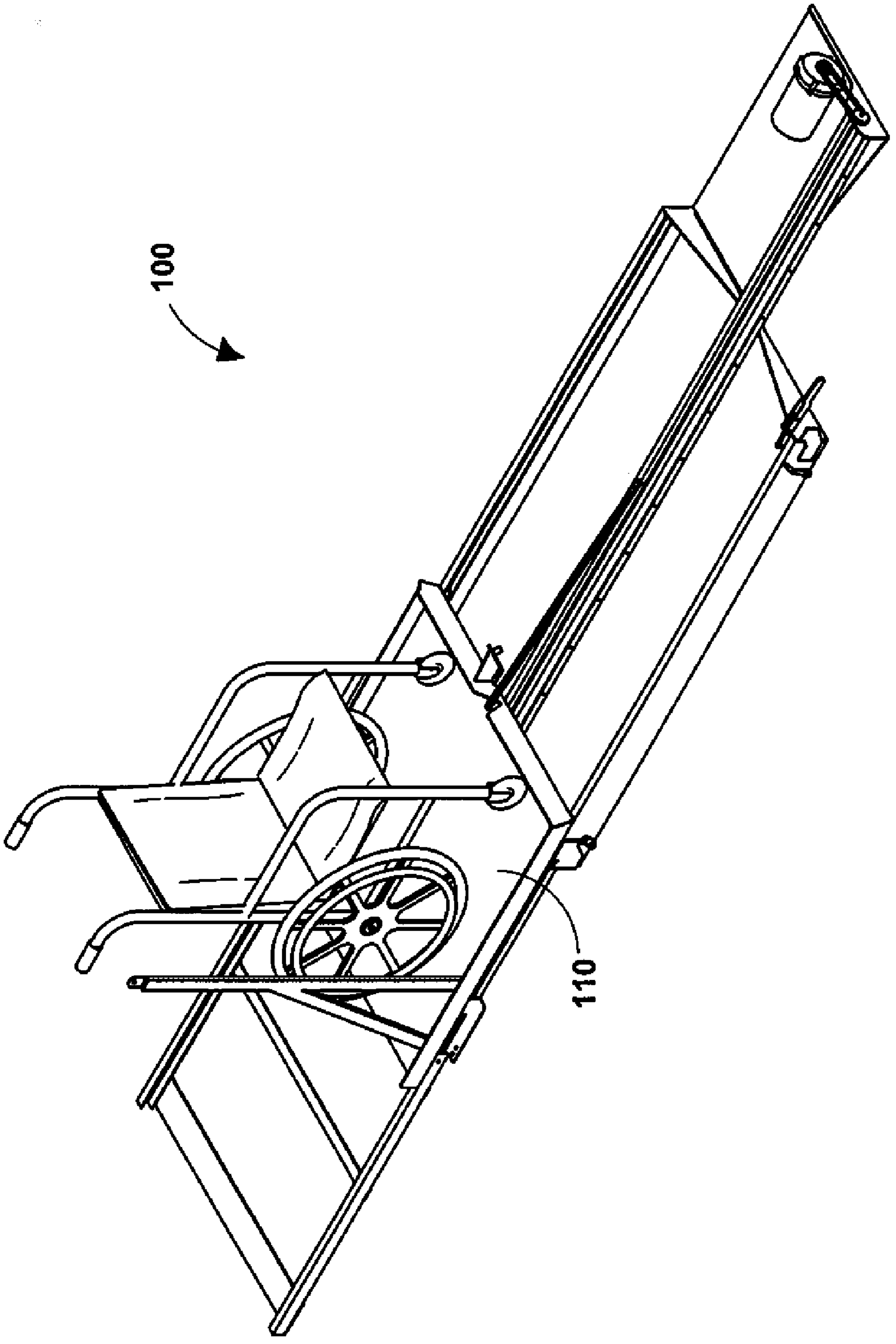
FIG. 7 is an exemplary embodiment of a platform and track system more particularly disclosing a partially extended state.

FIG. 7 is yet another perspective view of a secure loading system 100, showing platform 110 in a partially-extended position.

FIG. 8 is yet another perspective view of a secure loading system 100 showing platform 110 in a fully-retracted position.

Figure 9:
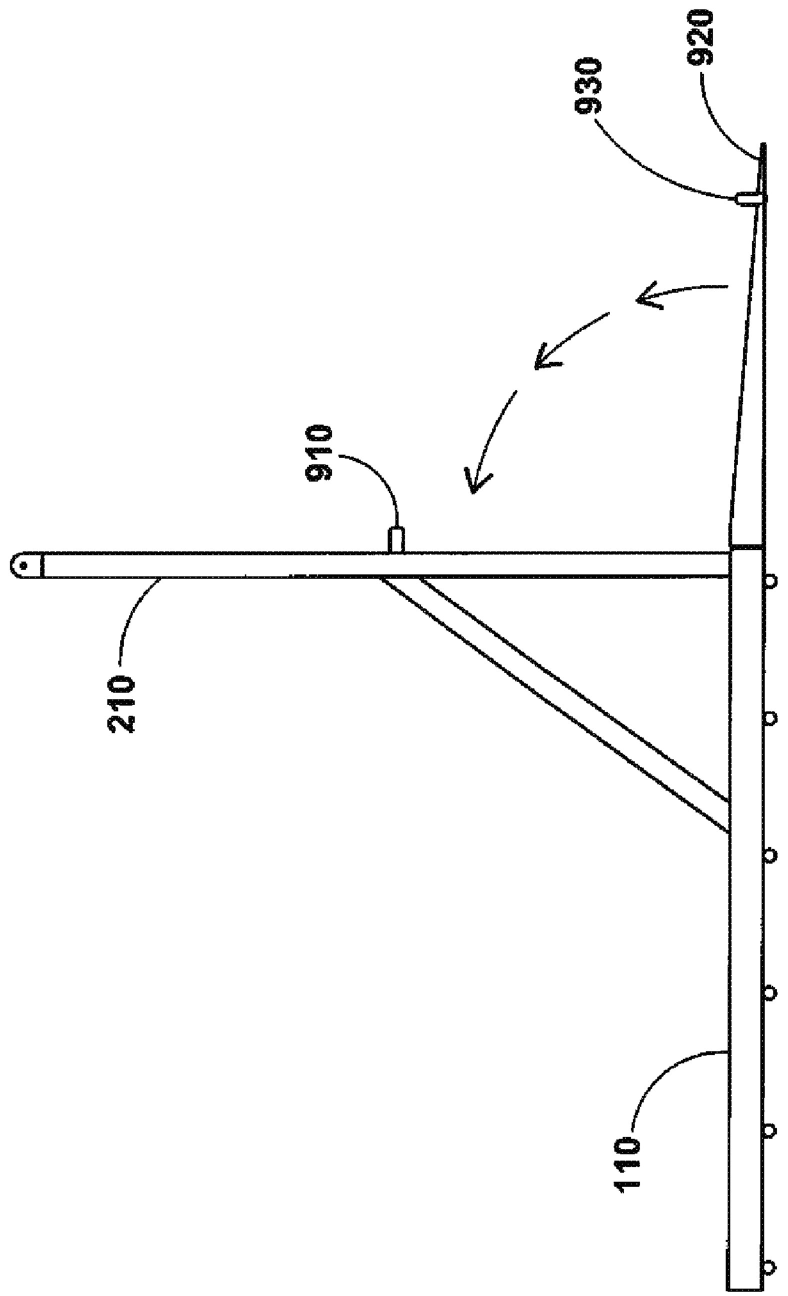
FIG. 9 is an exemplary embodiment of a secure loading system disclosing a feature whereby a lift platform is used to provide structural stability to a shoulder restraint securing bar.

FIG. 9 is an exemplary embodiment of a secure loading system wherein a lift platform 920 may be raised to provide additional structural support to shoulder restraint securing bar 210. In this case, lift platform 920 may be designed as an integral part of the lift, and may be the same as platform 110. Lift platform 920 is designed to move into an upright position when the lifting maneuver is completed as the arrows illustrate. Lift platform 920 includes a cam 930, which is configured to engage latch 910 when lift platform 920 is raised. Although a latch 910 and cam 930 are disclosed, persons having skill in the art will recognize that it is trivial to either have the latch 910 and cam 930 trade places with each other, or to use an alternative securing system such as a magnet, hook, cord, interlock, tie or other suitable mechanism. Alternatively, lift platform 920 may be an off-the-shelf platform for a lift, and support frame 180 may provide cam 930 or an alternative mechanism.

Figure 10:
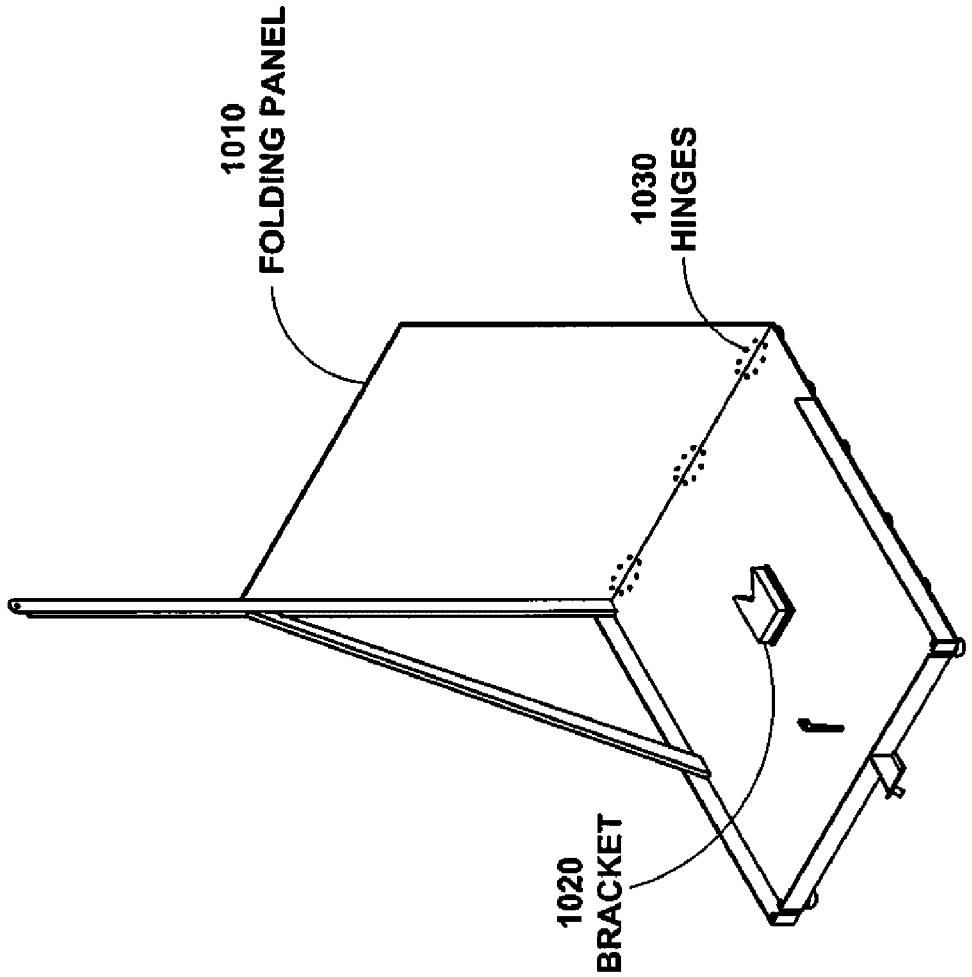
FIG. 10 is a perspective view of an alternative embodiment of a platform.

FIG. 10 shows an alternative embodiment of a platform 110, in which is disclosed an alternative method of providing additional security and structural support to shoulder restraint securing bar 210. In this embodiment, platform 110 includes a folding panel 1010, which may be folded up behind load 190 when load 190 is secured to platform 110. This provides additional safety from back rolling. Folding panel 1010 rotates on hinges 1030, and may be secured with a latch and cam mechanism or other suitable securing device.

The secure loading system as described structurally above may enable a method of loading a load into a vehicle, which may include the following illustrative steps. First, a load 190 may be secured to a platform 110, which is either attached to or part of a lift. The lift may then be caused to actuate a vertical motion, whereby the platform 110 is brought into a position substantially coplanar with mechanical guide 160, in an extended position. Next, an actuator 152 may be used to actuate horizontal motion in platform 110, whereby platform 110 is moved into a retracted position within the vehicle. Finally, the platform 110 may be secured within the vehicle.

Conversely, a method for unloading a load 190 from a vehicle is also enabled. In this case, platform 110 may be unsecured from the vehicle, and actuator 152 may be used to actuate horizontal motion in platform 110, whereby platform 110 is moved from a retracted position to an extended position that is substantially coplanar with mechanical guide 160. The lift is then used to provide vertical motion, moving load 190 to a plane either above or below mechanical guide 160.

FIG. 1 also illustrates a lift 168. Lifts 168 are known in the prior art. Support frame 180 is mechanically fixed to the lift and platform 110. The lift is enabled to raise and lower the platform.

While the subject of this specification has been described in connection with one or more exemplary embodiments, it is not intended to limit the claims to the particular embodiments set forth. On the contrary, the appended claims are intended to cover such alternatives, modifications and equivalents as may be included within their spirit and scope.

What is claimed is:

1. A secure loading system for loading a wheelchair into a motor vehicle, the secure loading system comprising:
- a platform configured to hold the wheelchair, the platform comprising:
  - latches configured to secure the wheelchair to the platform;
  - a shoulder restraint securing bar configured to engage a shoulder restraint of the motor vehicle;
  - a T-slot;
- a lift with sufficient power to lift the wheelchair;
- a support frame mechanically fixed to the lift and configured to receive the platform;
- a track system mechanically fixed to the motor vehicle, the track system including C-channels configured to receive the platform and a downward-biased platform lock configured to engage a protrusion of the platform;
- a rigid drive shaft terminating in a near end with a T-connector configured to securely engage the T-slot and having a nut at a removed end;
- a linear actuator including a rotor driving a screw, the screw configured to rotatably engage the nut; and
- extension arms rotatably engaging and extending from the C-channels to the platform and configured to bridge a gap when the platform is in an extended position;
- whereby:
  - the platform rests upon the support frame when the platform is in an extended and lowered position;
  - the lift is enabled to raise the support frame and the platform, whereby the platform is brought into an extended position substantially coplanar with the track system;
  - the linear actuator is enabled to actuate the drive shaft, causing the platform to move from the support frame and move from an extended position to a retracted position, the retracted position being within the vehicle; and
  - the downward-biased platform lock automatically engages the protrusion from the platform, securing the platform within the vehicle.

2. A secure loading system for engagement with a lift with sufficient power to lift a wheelchair, the secure loading system for loading a wheelchair into a motor vehicle, the secure loading system comprising:
- a platform configured to hold the wheelchair, the platform comprising:
  - latches configured to secure the wheelchair to the platform;
  - a shoulder restraint securing bar configured to engage a shoulder restraint of the motor vehicle;
  - a T-slot;
- a support frame mechanically fixed to he lift and configured to receive the platform;
- a track system mechanically fixed to the motor vehicle, the track system including C-channels configured to receive the platform and a downward-biased platform lock configured to engage a protrusion of the platform;
- a rigid drive shaft terminating in a near end with a T-connector configured to securely engage the T-slot and having a nut at a removed end;
- a linear actuator including a rotor driving a screw, the screw configured to rotatably engage the nut; and
- extension arms rotatably engaging and extending from the C-channels to the platform and configured to bridge a gap when the platform is in an extended position;
- whereby:
  - the platform rests upon the support frame when the platform is in an extended and lowered position;
  - the lift is enabled to raise the support frame and the platform, whereby the platform is brought into an extended position substantially coplanar with the track system;

the linear actuator is enabled to actuate the drive shaft, causing the platform to move from the support frame and move from an extended position to a retracted position, the retracted position being within the vehicle; and the downward-biased platform lock automatically engages the protrusion from the platform, securing the platform within the vehicle.

* * * * *